(12) United States Patent
Meyer et al.

(10) Patent No.: US 7,467,070 B2
(45) Date of Patent: Dec. 16, 2008

(54) METHODS AND SYSTEMS FOR MODELING STRESS INTENSITY SOLUTIONS FOR INTEGRALLY STIFFENED PANELS

(76) Inventors: Eric S. Meyer, 342 Ridge Trail Dr., Chesterfield, MO (US) 63017; Scott S. Fields, 2931 Kettering Dr., St. Charles, MO (US) 63303; Ken L. Knopp, 13118 Dartagnon Dr., Creve Coeur, MO (US) 63141; Jeffrey S. Sermersheim, 2357 Delaware Dr., St. Charles, MO (US) 63303

( * ) Notice: Subject to any disclaimer, the term of this patent is extended or adjusted under 35 U.S.C. 154(b) by 468 days.

(21) Appl. No.: 10/974,496

(22) Filed: Oct. 26, 2004

(65) Prior Publication Data

US 2006/0089823 A1    Apr. 27, 2006

(51) Int. Cl.
*G06F 17/50* (2006.01)
*G06F 17/10* (2006.01)

(52) U.S. Cl. .................. 703/1; 703/2; 702/42

(58) Field of Classification Search .............. 703/1, 703/2, 6; 702/42; 73/789, 794
See application file for complete search history.

(56) References Cited

U.S. PATENT DOCUMENTS

| | | | |
|---|---|---|---|
| 3,387,120 A | 6/1968 | Funk et al. | |
| 3,979,579 A | 9/1976 | Kleinpeter | |
| 4,336,595 A | 6/1982 | Adams et al. | |
| 4,480,480 A | 11/1984 | Scott et al. | |
| 4,524,620 A | 6/1985 | Wright et al. | |
| 4,722,062 A | 1/1988 | Breitkopf et al. | |
| 4,764,882 A | 8/1988 | Braschel et al. | |
| 4,858,146 A | 8/1989 | Shebini | |
| 4,875,170 A | 10/1989 | Sakurai et al. | |
| 5,490,195 A | 2/1996 | Berkley | |
| 5,684,713 A | 11/1997 | Asada et al. | |
| 5,736,645 A | 4/1998 | Chin-Chan et al. | |
| 5,777,236 A | 7/1998 | Walls | |
| 5,816,530 A | 10/1998 | Grube | |
| 5,826,213 A | 10/1998 | Kennefick | |
| 5,841,040 A | 11/1998 | Walls | |
| 5,847,668 A | 12/1998 | Morita et al. | |
| 6,128,577 A | 10/2000 | Assa et al. | |
| 6,212,486 B1 | 4/2001 | Huang et al. | |
| 6,295,513 B1 | 9/2001 | Thackston | |
| 6,301,970 B1 | 10/2001 | Biggs et al. | |
| 6,456,289 B1 | 9/2002 | O'Brien et al. | |
| 6,657,429 B1 | 12/2003 | Goldfine et al. | |
| 6,662,088 B1 | 12/2003 | Hopple et al. | |

(Continued)

OTHER PUBLICATIONS

Pian, T. State-of-the-Art Development of Hybrid/Mixed Finite Element, Finite Elements in Analysis and Design, vol. 21, Oct. 1994, pp. 5-20.*

(Continued)

*Primary Examiner*—Russell Frejd

(57) ABSTRACT

Systems and methods for modeling stress intensity solutions of integrally stiffened panels are disclosed. In one embodiment, a method includes serving a process over the internet. The process includes taking a problem definition, automatically forming a finite element model at least partially based on the problem definition, automatically verifying a suitability condition of the finite element model, automatically solving a computational solution using the finite element model and automatically validating the computational solution. In one aspect, providing a problem definition includes at least one of providing a geometry definition, providing a crack definition, and providing load and constraint definition.

28 Claims, 13 Drawing Sheets

U.S. PATENT DOCUMENTS

| | | | |
|---|---|---|---|
| 6,785,616 B2 | 8/2004 | Lung et al. | |
| 6,813,592 B1 * | 11/2004 | Dhondt | 703/2 |
| 6,813,749 B2 | 11/2004 | Rassaian | |
| 6,874,370 B1 | 4/2005 | Vachon | |
| 6,901,809 B2 * | 6/2005 | Dong et al. | 73/789 |
| 7,016,825 B1 * | 3/2006 | Tryon, III | 703/6 |
| 7,089,124 B2 * | 8/2006 | Dong et al. | 702/42 |
| 2001/0053965 A1 * | 12/2001 | Horn et al. | 703/2 |
| 2004/0148143 A1 * | 7/2004 | Deobald et al. | 703/2 |

OTHER PUBLICATIONS

Lin et al., T.Y. Mechanics of Interfacial Determination Under Hygrothermal Stresses During Reflow Soldering, Proceedings of the 1997 1st Electronic Packaging Technology Conference, Oct. 1997, pp. 163-169.*

Yu et al., J. Structural Analysis and Preliminary Design of HT-7U Cryostat, IEEE 19th Symposium on Fusion Engineering, Jan. 2002, pp. 372-375.*

* cited by examiner

METHODS AND SYSTEMS FOR MODELING STRESS INTENSITY SOLUTIONS FOR INTEGRALLY STIFFENED PANELS

FIELD OF THE INVENTION

This invention relates to structural analysis, and, more specifically, to methods and systems for modeling stress intensity solutions for integrally stiffened panels.

BACKGROUND OF THE INVENTION

The calculation of stress intensity solutions can be one of the most difficult problems in engineering. With the ever-increasing pressure to reduce manufacturing and maintenance costs, the use of unitized structures to decrease part count is increasing. One of the most effective unitized structural designs is an integrally stiffened panel. The damage tolerance requirements for these integrally stiffened panels are the same as those for the built-up structure being replaced. These requirements may necessitate the calculation of crack growth rates and residual strength, both of which require accurate stress intensity solutions.

Previously, stress intensity determinations in integrally stiffened structures were performed by engineering specialists who were typically experts in finite element analysis. Currently, there are very few such engineering specialists available to perform such stress intensity calculations. Furthermore, solving a single problem typically takes such a specialist engineer weeks or months of effort, making design trade studies of integral panels expensive and time-consuming. Therefore, methods and systems for calculating stress intensities in a more cost effective manner would be useful.

SUMMARY OF THE INVENTION

The present invention is directed to methods and systems for modeling stress intensity solutions of integrally stiffened panels with cracks. Methods and systems in accordance with the present invention may advantageously allow stress intensity calculations to be performed by persons not having expertise in the field of finite element analysis, substantially reducing the time and expense associated with stress intensity determinations in comparison with the prior art. Structural design trade studies can be performed relatively cheaply and quickly, and may result in more robust, lighter weight, and more affordable structural components.

In one embodiment, a method of performing stress intensity computations includes providing a problem definition, and automatically forming a finite element model at least partially based on the problem definition. The method further includes automatically verifying a suitability condition of the finite element model, and automatically solving a computational solution using the finite element model. Finally, the method includes automatically validating the computational solution. In one aspect, providing a problem definition includes at least one of providing a geometry definition, providing a crack definition, and providing a load and constraint definition.

In another aspect, a method includes automatically forming a finite element model at least partially based on the problem definition wherein the problem definition includes at least one crack. Alternately, automatically forming a finite element model may include building a panel cross-section, adding at least one crack to the panel cross-section, extruding a first cross-section to build a full panel model, building a computational mesh, and applying at least one of a load and a constraint.

In yet another embodiment, a method of performing stress intensity computations includes providing a plurality of servers, each server being operatively coupled to at least one other server and having an application service. A plurality of client computers is provided, each client computer being operatively coupled to at least one of the servers. A problem definition is provided from a respective one of the client computers to a corresponding one of the servers. Using the application service of the corresponding one of the servers, a resource availability of the corresponding one of the servers is determined and if the resource availability is sufficient, an application corresponding to the problem definition is performed on the corresponding one of the servers. If the resource availability of the corresponding one of the servers is not sufficient, the application service of the corresponding one of the servers determines a second resource availability of at least one other server and if the second resource availability is sufficient, the application corresponding to the problem definition is performed on the other server. The performance of the application includes automatically forming a finite element model at least partially based on the problem definition, automatically verifying a suitability condition of the finite element model, automatically solving a computational solution using the finite element model, and automatically validating the computational solution.

BRIEF DESCRIPTION OF THE DRAWINGS

Preferred and alternate embodiments of the present invention are described in detail below with reference to the following drawings.

DETAILED DESCRIPTION

The present invention relates to methods and systems for modeling stress intensity solutions of integrally stiffened panels, including panels with cracks. Many specific details of certain embodiments of the invention are set forth in the following description and in FIGS. 1-17 to provide a thorough understanding of such embodiments. One skilled in the art, however, will understand that the present invention may have additional embodiments, or that the present invention may be practiced without several of the details described in the following description.

In general, embodiments of methods and systems in accordance with the present invention advantageously automate the process of building a finite element model, extracting a stress intensity solution, and validating the results. A user does not need to be a finite element expert to perform stress intensity computations using the methods and systems in accordance with the present invention. Building a relatively sophisticated finite element model requires only that a user enter a cross-sectional geometry of a structural member to be analyzed (e.g., panel) and to input the desired cracked lengths for which stress intensities are desired. Embodiments of the present invention enable the user to access a single computational tool that will generate stress intensity solutions for structures, including integrally stiffened panels, for use in calculating the crack growth rate and residual strength with virtually any damage tolerance analysis software.

Figure 1:
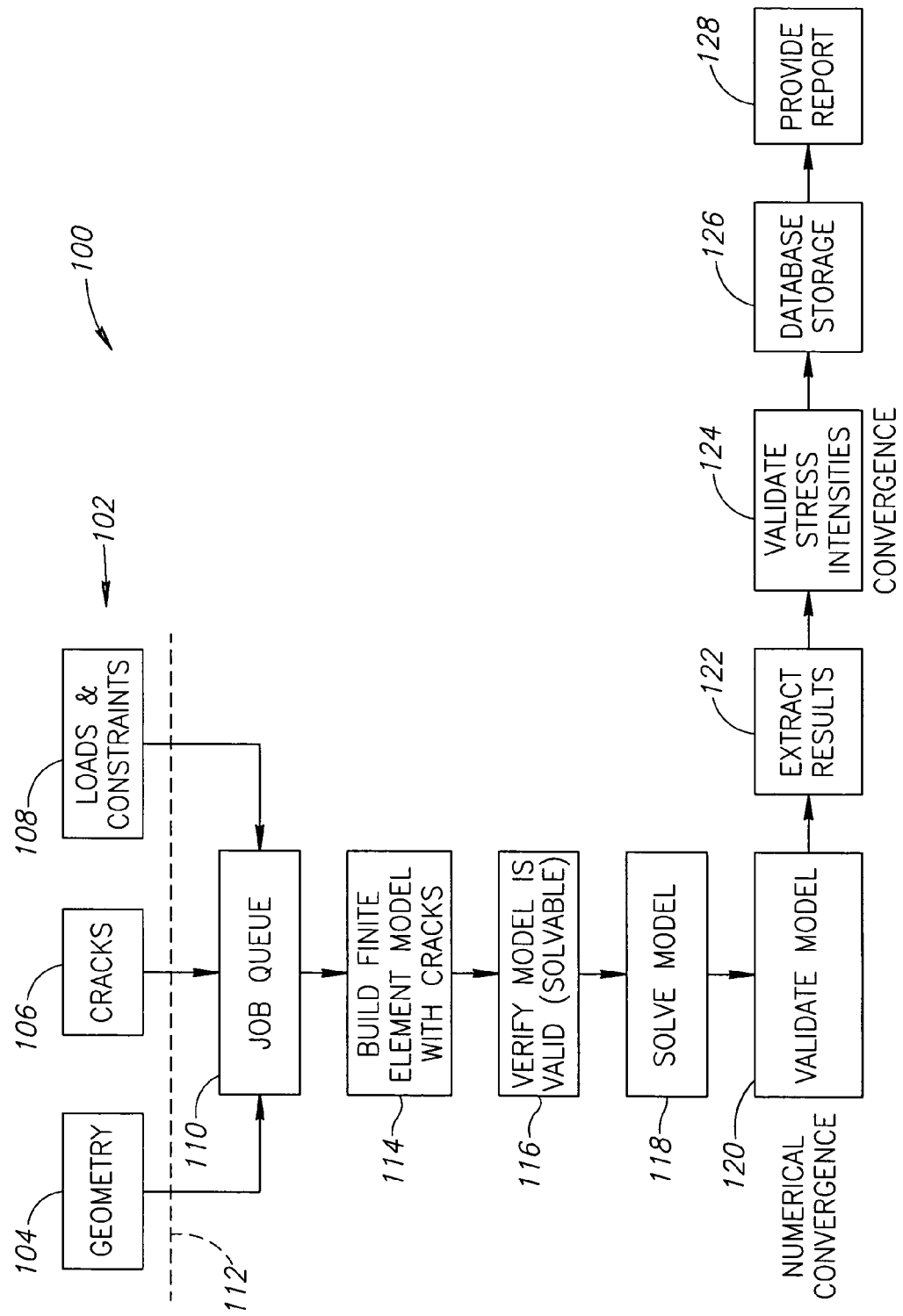
FIG. 1 is a flowchart of a method for calculating stress intensity solutions for integrally stiffened panels in accordance with an embodiment of the present invention.
Figure 2:
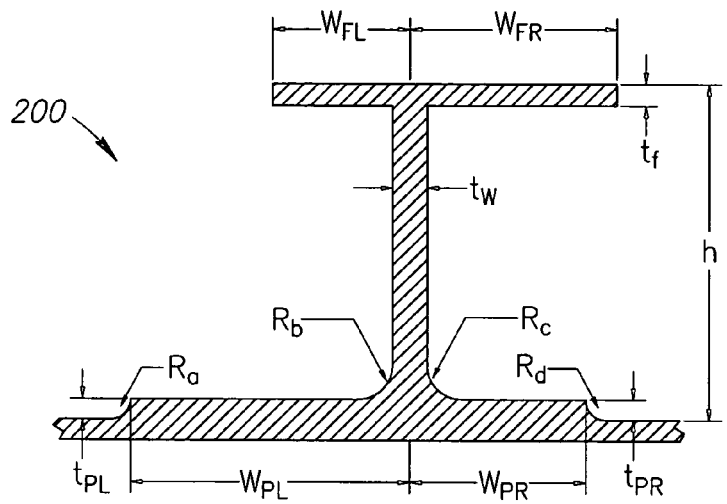
FIG. 2 is an end view of a stiffener geometry in accordance with an embodiment of the present invention.
Figure 3:
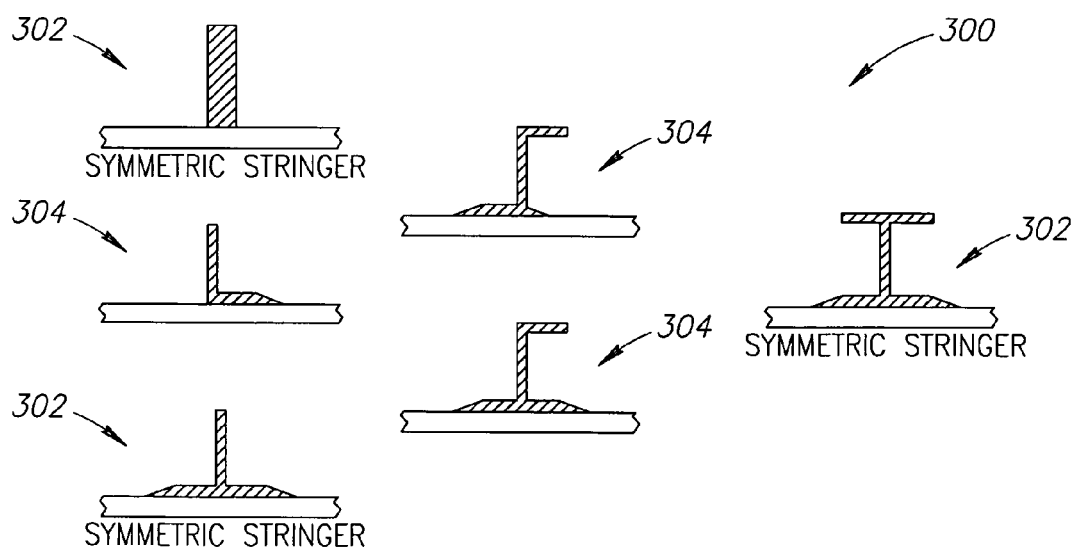
FIG. 3 is an end view of a plurality of common stiffener geometries that may be modeled in accordance with embodiments of the present invention.
Figure 6:
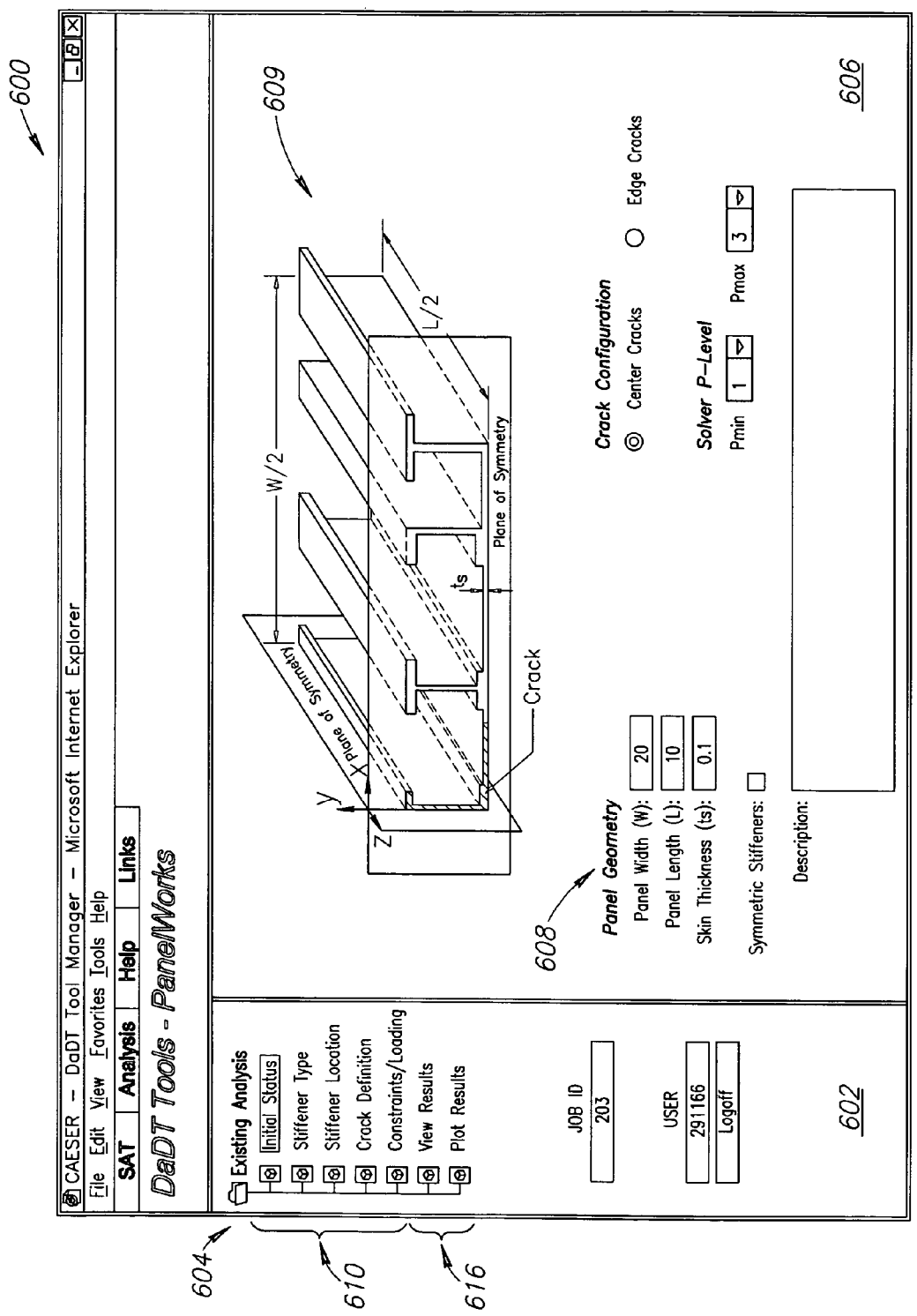
FIG. 6 is a representative menu of a menu-based input program for performing a panel definition input of the problem definition portion of FIG. 1.
Figure 13:
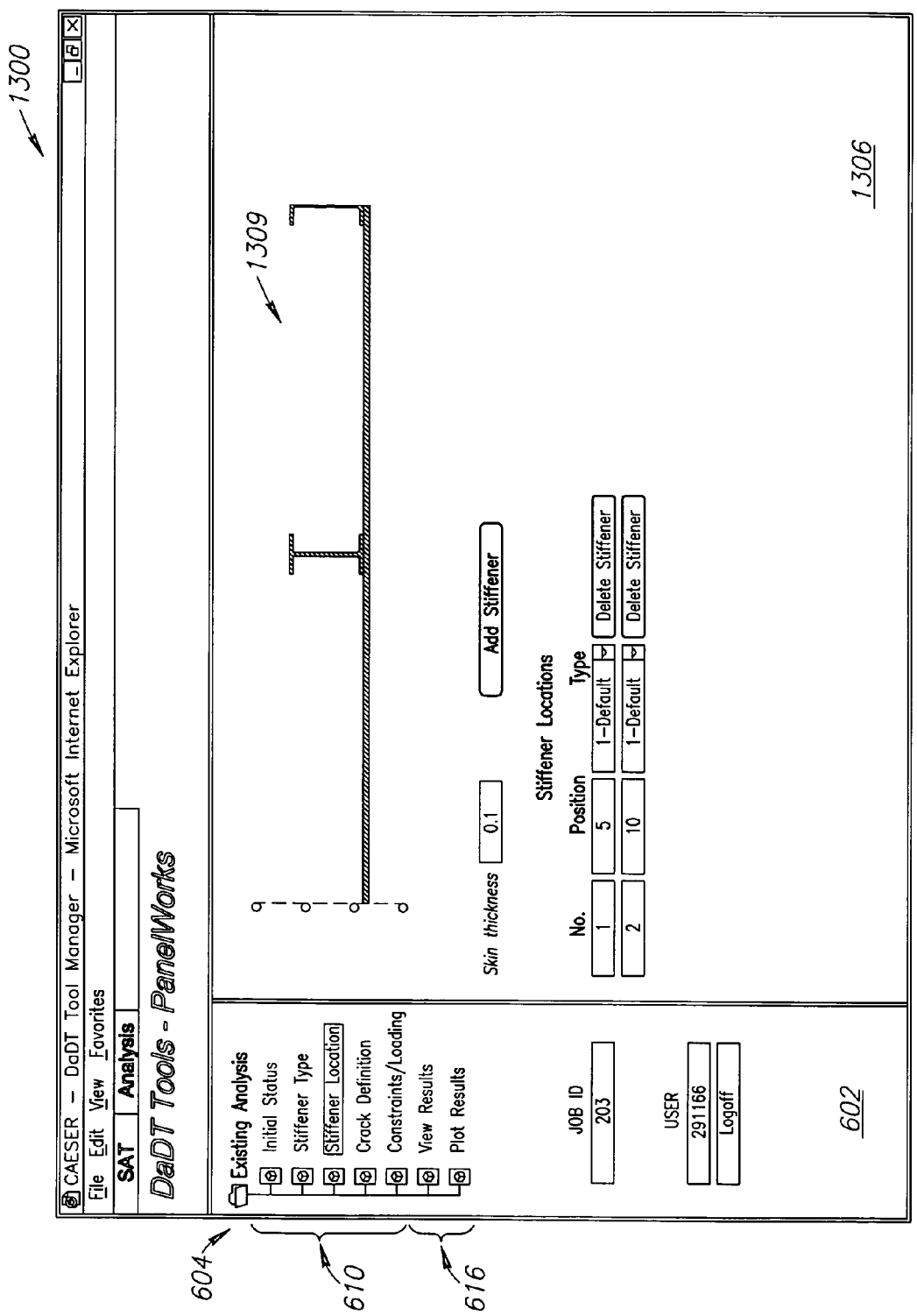
FIG. 13 is a representative menu of the menu-based input program for providing stiffener locations in accordance with an embodiment of the invention.

FIG. 1 is a flowchart of a method 100 for calculating stress intensity solutions for integrally stiffened panels in accordance with an embodiment of the present invention. The method 100 has a problem definition portion 102 that includes a geometry definition at a block 104, a crack definition at a block 106, and a load and constraint definition at a block 108. In the geometry definition (block 104), a user provides inputs to the method 100 defining the structure to be analyzed. In one embodiment, the structure to be analyzed may include a stiffener. FIG. 2 is an end view of a stiffener geometry 200, and the associated parameters that may be input by the user to define the stiffener geometry 200 for subsequent analysis by the method 100. More specifically, as shown in FIGS. 2, 6, and 13, the user may define the stiffener geometry 200 based on the following variables:

$h$—overall stiffener height,
$W_{FL}$—width of upper stiffener flange on left side,
$W_{FR}$—width of upper stiffener flange on right side,
$W_{PL}$—width of lower stiffener pad on left side,
$W_{PR}$—width of lower stiffener pad on right side,
$t_W$—thickness of the stiffener web,
$t_f$—thickness of the upper stiffener flange,
$t_{PL}$—thickness of the lower stiffener pad on the left side,
$t_{PR}$—thickness of the lower stiffener pad on the right side,
$R_a$—radius of the lower stiffener pad-to-skin transition on the left side,
$R_b$—radius of the lower stiffener pad-to-stiffener web transition on the left side,
$R_c$—radius of the lower stiffener pad-to-stiffener web transition on the right side,
$R_d$—radius of the lower stiffener pad-to-skin transition on the right side,
$W$—panel width,
$L$—panel length,
$t_s$—skin thickness,
Label—descriptive label of each stiffener type for identification purposes,
$x$—distance of the centerline of each individual stiffeners from the origin, Using the above-referenced representative parameters, the user may model a wide variety of stiffener geometries 200 for analysis using the method 100. For example, FIG. 3 is an end view of a plurality of common stiffener geometries 300 that may be modeled using the above-referenced representative parameters. As shown in FIG. 3, the above referenced representative parameters may be used to define a variety of different symmetric stiffener geometries 302 and asymmetric stiffener geometries 304. It will be appreciated that alternate embodiments of stiffener geometries may be modeled using the above-referenced representative parameters, and that the method 100 is not limited to the particular stiffener geometries 302, 304 shown in FIG. 3.

Figure 4:
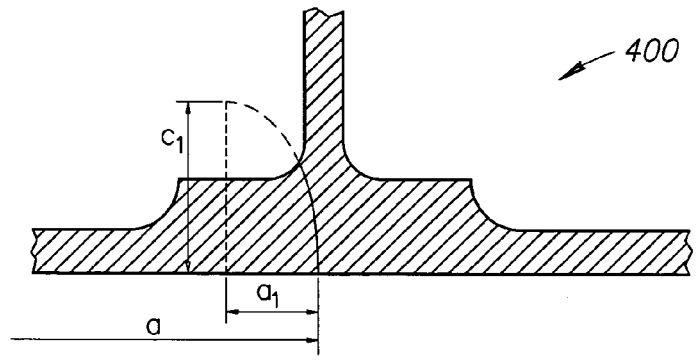
FIG. 4 is a representative crack front model in accordance with an embodiment of present invention.
Figure 14:
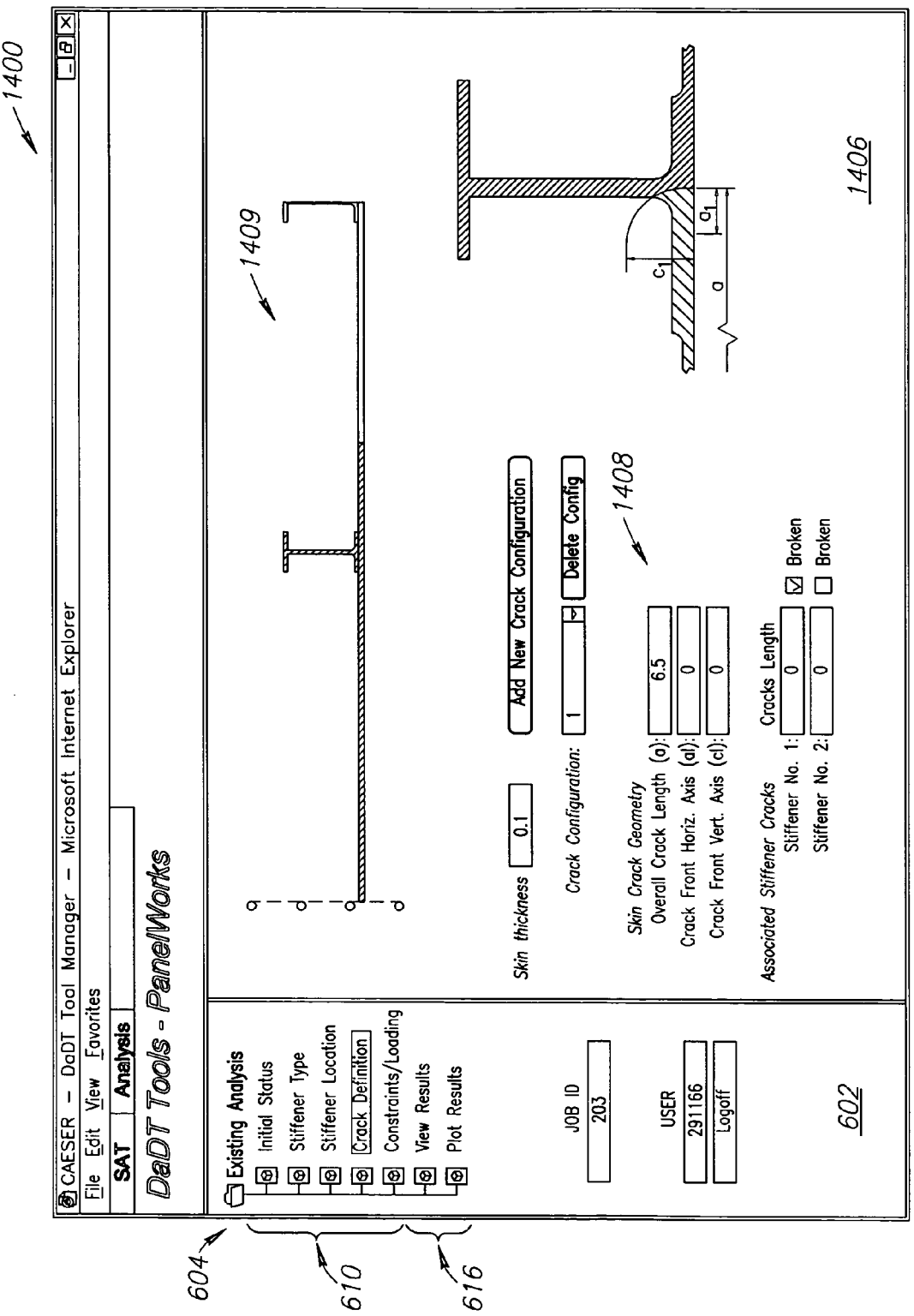
FIG. 14 is a representative menu of the menu-based input program for providing crack geometry in accordance with an embodiment of the invention.

As described above, the user may define one or more crack definitions (block 106) to apply to the stiffener geometry 200. FIGS. 4 and 14 is a representative crack front model 400 in accordance with an embodiment of present invention. In this embodiment, the crack front model 400 may be defined by the user using the following crack front definition parameters:

crack configuration—center crack or edge crack,
$c_1$—crack front vertical axis for corner cracks
$a_1$—crack front horizontal axis for corner cracks
$a$—overall crack length,
$w_{cr}$—stiffener web crack length (input for each stiffener)

Figure 5:
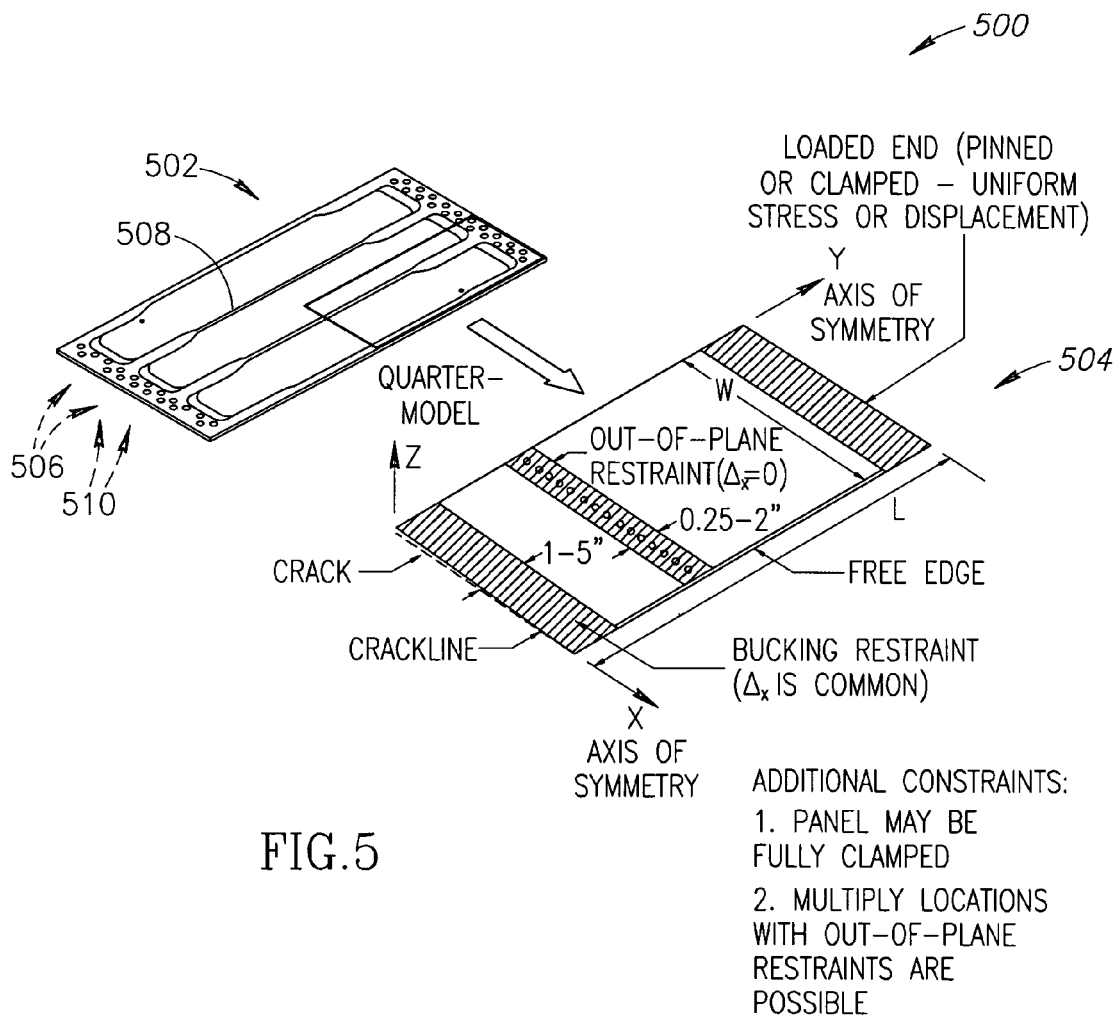
FIG. 5 is a schematic view of a set of loading and boundary constraints that may be applied in accordance with the method of FIG. 1.

Using the crack front definition parameters shown in FIG. 4, the user may model a variety of crack fronts, including straight-through and elliptical crack fronts. Furthermore, in alternate embodiments, multiple crack fronts can be modeled using the method 100. This may be useful, for example, to account for the interaction of a skin crack with a partially-failed stiffener. Also during the problem definition portion 102 of the method 100, the user defines the loading and boundary constraints (block 108) that are to be applied to the geometry definition (block 104). More specifically, FIG. 5 is a schematic view of a set of loading and boundary constraints 500 that may be applied by the user in accordance with the method 100 of FIG. 1. Following the definition of the geometry (block 104), in this case an integrally-stiffened panel 502, the user defines the loading and boundary constraint parameters 504 to be applied to the geometry, including the following representative variables (see FIG. 5): Grip length, Intermediate Rib position, Intermediate Rib width, Intermediate Rib spring constant, Buckling bar height, Buckling bar gap, Buckling bar material elastic modulus (E), Buckling bar material Poisson's ratio, Gap material elastic modulus (E), Gap material shear modulus (G), Applied tension stress, Applied displacement, and Axis of symmetry.

In some embodiments, either a uniform stress or a uniform displacement may be defined using the loading and boundary constraint parameters 504. Additionally, the out-of-plane restraint scheme may have the capability to utilize a user-input stiffness to simulate the effect of ribs. More specifically, a spring constant applied over the whole skin surface in a direction normal to the xy-plane of the panel 502 (FIG. 5) may be defined to simulate the effect of ribs. In one particular embodiment, the spring coefficient may be defined by a formula that evaluates to zero everywhere except in a narrow band parallel to the x-axis where the rib is located. The user only inputs the position and width of the rib (spring) and the stiffness (spring constant in kips/in/in$^2$).

In addition, buckling bars 506 may be added by the user in the region of the model where buckling constraints are required. The buckling bars may increase the local stiffness of a panel 508 of the geometry definition 502 but do not include any external constraints. A thin layer of elements 510 may be inserted between the panel 508 and the buckling bars 506, wherein the elements 510 may have orthotropic material properties selected in such a way that the stiffness in the in-plane direction is much less than the stiffness normal to the skin. In such embodiments, the buckling bars 506 may be prevented from taking any significant amount of the externally applied load the user inputs a height of the buckling bar 506, a gap (i.e., thickness of elements 510 between the panel 508 and bar 506), and the material is defined by entering Young's modulus (ksi) and Poisson's ratio v.

Referring again to FIG. 1, following the input of the user's problem definition (blocks 104, 106, 108), the user's inputs (or suitable default inputs) are passed to a job queue at a block 110. In one embodiment, the problem definition portion 102 of the method 100 may be performed on a user's personal computer (PC) and may be transmitted to a remote server via a communication network 112 (e.g., wireless link, Internet, world wide web, intranet, etc.) for further processing.

More specifically, in one particular embodiment, the problem definition portion 102 may utilize a menu-based input program that receives the user's problem definition inputs (blocks 104, 106, 108) and formulates suitable outputs to the job queue 110. FIG. 6 is a representative menu 600 of a menu-based input program for performing a panel definition input of the problem definition portion 102 of FIG. 1. In this embodiment, the representative menu 600 includes a first window portion 602 including a plurality of section options 604. The section options 604 approximately correspond to various portions of the method 100 that may be accessed by the user. For example, the section options 604 include problem definition options 610 devoted to the problem definition portion 102 of the method 100, a job status option 612 (not shown) for checking the status of a particular job that has been submitted to the job queue 110, a submitted analysis option 614 (not shown) for submitting a particular job to the job queue 110, and options for viewing the computational results 616 in tabular form and in graphical form are provided.

As depicted in FIG. 6, the user may highlight the "PANEL DEFINITION" option to provide the inputs associated with the panel portion of the structure being analyzed. A second window portion 606 includes a set of input areas 608. In the representative example shown in FIG. 6, the set of input areas 608 correspond to the inputs defined by the user for defining the panel of the structure being analyzed. A visual representation 609 of the structure being analyzed is also provided in the second window portion 606.

Figure 7:
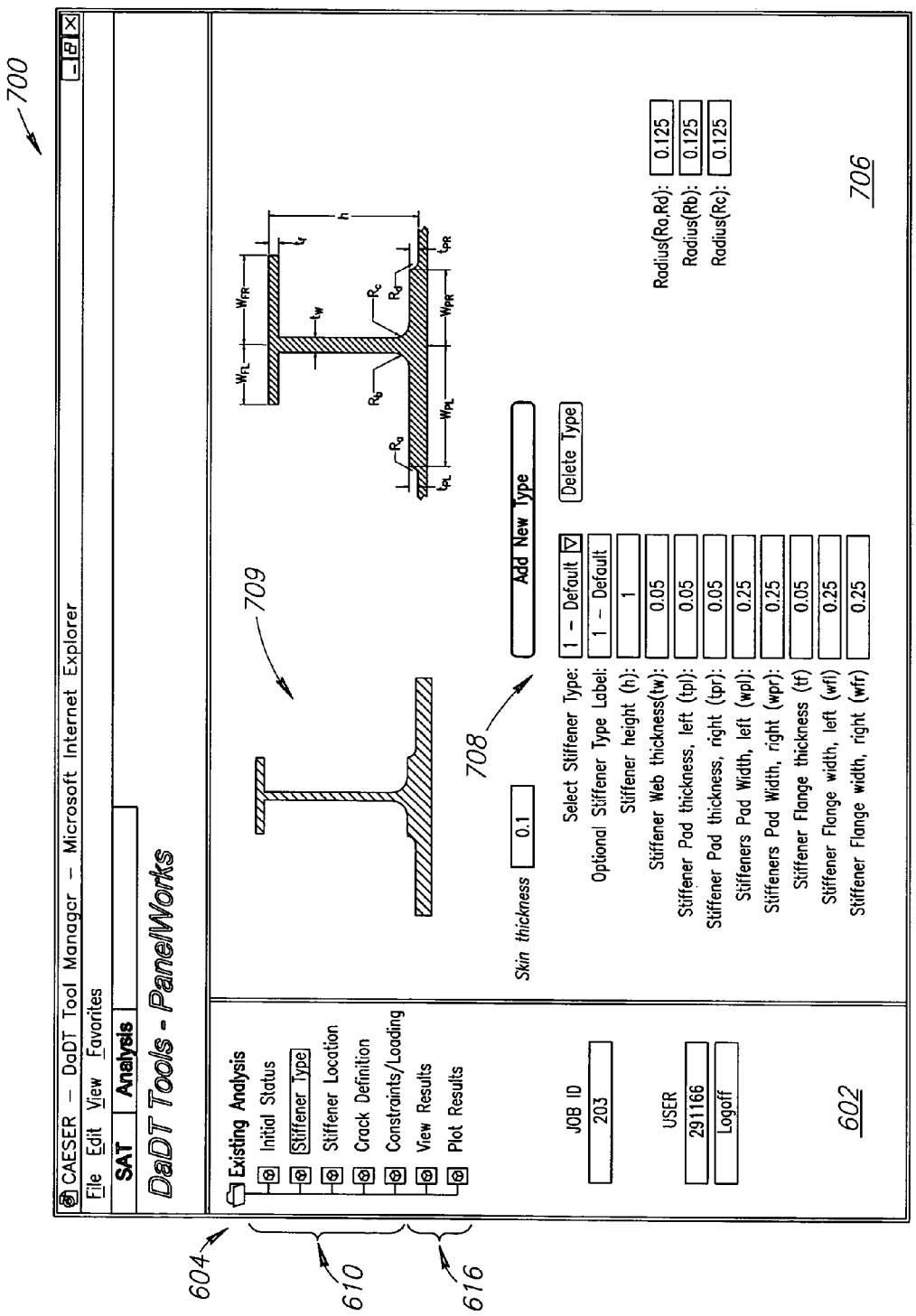
FIG. 7 is a representative menu of the menu-based input program for performing a stiffener definition input of the problem definition portion of FIG. 1.

It will be appreciated that the menu-based software program may further provide additional menus having alternate sets of input areas corresponding to the other problem definition section options 604 (i.e., stiffener types, stiffener location, crack definition, constraints, applied loading). For example, FIG. 7 is a representative menu 700 of the menu-based input program for performing a stiffener definition input. In this embodiment, the user has highlighted the "STIFFENER TYPES" option in the first window portion 602 to provide the inputs associated with the stiffeners of the structure being analyzed. A second window portion 706 includes a set of input areas 708 corresponding to the stiffener parameters that will be defined by the user for defining the stiffeners of the structure being analyzed. Again, a visual representation 709 of the stiffener being defined by the user is also provided in the second window portion 706. Furthermore, FIG. 13 is a representative menu 1300 of the menu-based input program for performing stiffener location functions. In this embodiment, the user has highlighted the "STIFFENER LOCATION" option in the first window portion 602 to provide the inputs associated with the locations of the stiffeners of the structure being analyzed, and a visual representation 1309 of the stiffener locations is provided in a second window portion 1306. Thus, the menu-based software program may allow the user to define the problem quickly and efficiently in comparison with prior art methods and systems.

Figure 8:
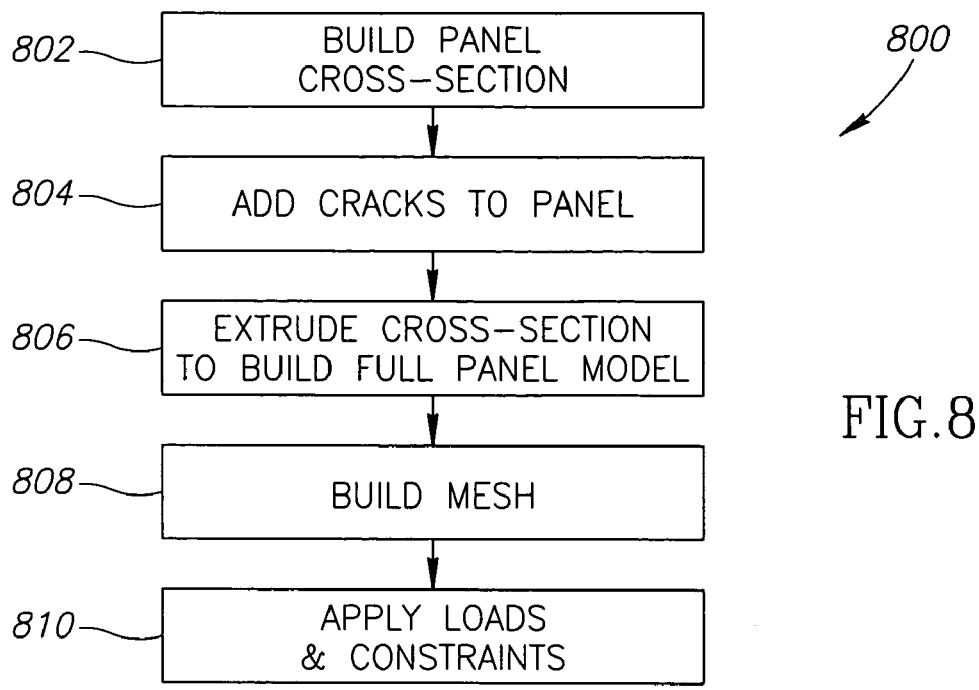
FIG. 8 is a flowchart of a process of building a finite element model including cracks in accordance with an embodiment of present invention.

As further shown in FIG. 1, a finite element model is built based on the problem definition portion 102 at a block 114. The finite element model may include cracks as defined by the user (block 106). FIG. 8 is a flowchart of a process 800 of building a finite element model including cracks in accordance with an embodiment of present invention. In this embodiment, the structure under analysis is an integrally-stiffened panel member. A panel cross-section is built at a block 802, which involves the construction of a complete finite element model from the geometric definition provided by the invention, including defining the stiffeners as described above. Cracks are then added to the panel at a block 804. FIG. 14 is a representative menu 1400 of the menu-based input program for performing crack definition functions. In this embodiment, the user has highlighted the "CRACK DEFINITION" option in the first window portion 602 to provide the inputs associated with the definitions of the cracks of the structure being analyzed. A plurality of crack definition parameters 1408, and a visual representation 1409 of the crack being defined, are provided in a second window portion 1406.

Figure 15:
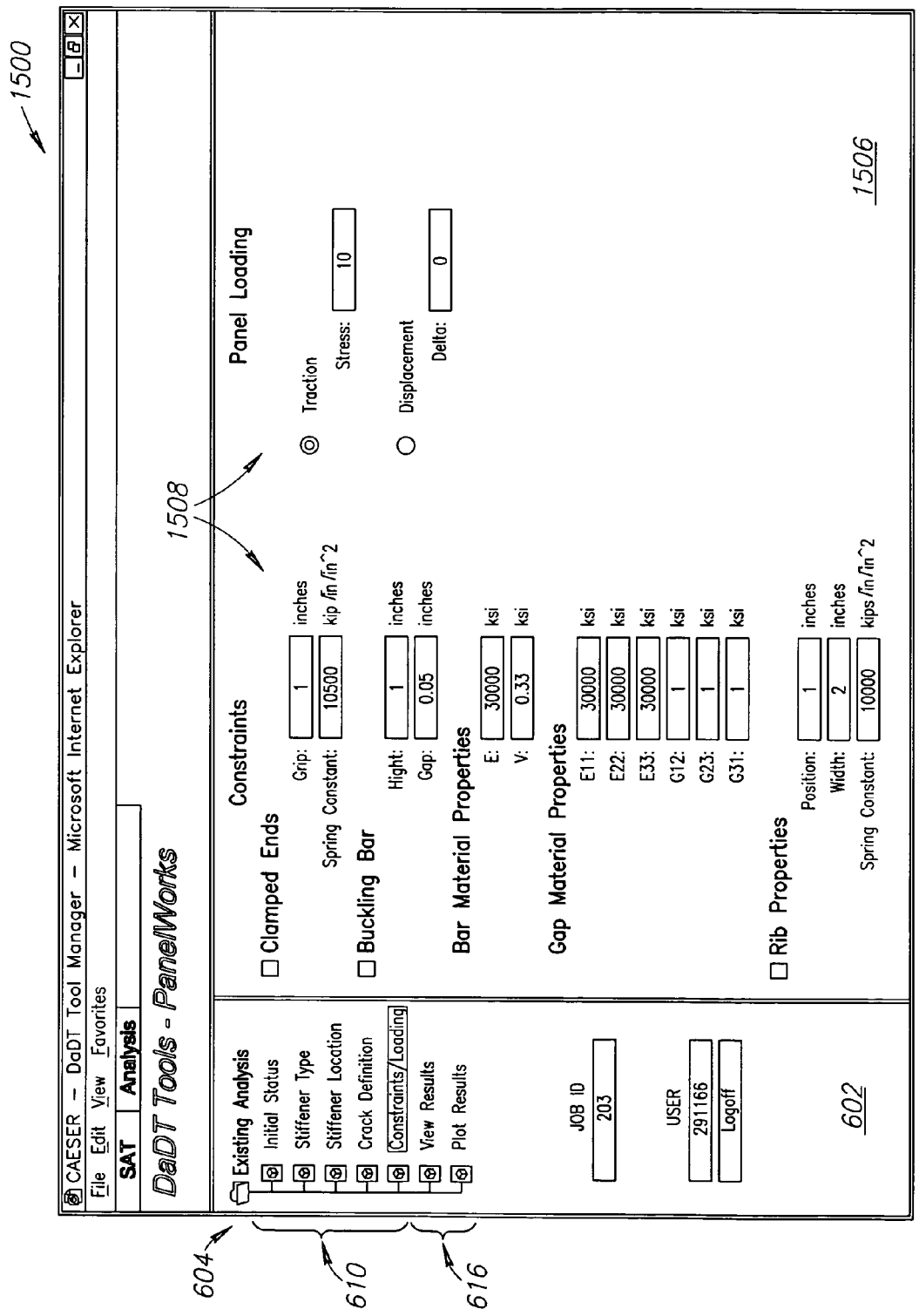
FIG. 15 is a representative menu of the menu-based input program for defining load and constraints applied to the structure to be analyzed in accordance with an embodiment of the invention.

As further shown in FIG. 8, the process 800 further includes extruding a cross-section to build a full panel model at a block 806. This includes defining a 2D panel cross-section, and then extruding the 2D cross-section to form a 3D panel. A computational mesh is built to perform the finite element stress computations at a block 808. In one particular embodiment, an automated mesh-generating software program known as StressCheck, commercially-available from Engineering Software Research and Development, Inc. of St. Louis, Mo., may be employed. At a block 810, loads and constraints defined by the user during the loads and constraints definition (block 108) are applied. FIG. 15 is a representative menu 1500 of the menu-based input program for defining load and constraints applied to the structure to be analyzed. In this embodiment, the user has highlighted the "CONSTRAINTS/LOADING" option in the first window portion 602 to provide the inputs associated with the applied loads and constraints. A plurality of loads and constraints parameters 1508 are provided in a second window portion 1506.

Referring again to FIG. 1, following the definition of the finite element model (block 114), a verification is performed to determine if the finite element model is valid and solvable at block 116. Various methods of determining whether a finite element model is valid and solvable are known in the art. Following this verification (block 116), the finite element model is transmitted to a finite element solver for computational solution at a block 118. Typically, the number of p-levels that will be computed by the finite element solver is controllable by the user. In some embodiments, a minimum of three p-levels are desirable to insure solution convergence. It will be appreciated that the finite element solver used for the computational solution at block 118 may be any suitable finite element analysis program. Again, in one particular embodiment, the finite element analysis program known as Stress-Check, commercially-available from Engineering Software Research and Development, Inc. of St. Louis, Mo., may be employed. Other suitable finite element analysis programs that may be used for this purpose include, for example, the ABAQUS program commercially available from ABAQUS, Inc. of Pawtucket, R.I., and the Pro/Mechanica program commercially available from Parametric Technology Corporation of Needham, Mass.

At block 118, the entire (global) finite element model is solved and at that time, stresses and displacements in the model are available. As this point, however, the stress intensities are still unknown. At a block 120, the global energy norm error is computed by determining how it is converging as a function of the overall model fidelity (e.g., either increasing p-level or number of elements in the model). This typically gives an indication as to whether or not the overall finite element model ran successfully but may not provide an accurate indication as to whether there are localized problems in certain regions of the overall model. At a block 122, the stress intensities are computed from the model results (that are available from block 118) in the region near the crack tip(s). At a block 124, the stress intensities from block 122 are validated by checking the convergence of the stress intensities as a function of the finite element model fidelity (the same as in block 120). This provides an indication as to whether the model provided good results in the local area near the crack tip(s). The stress intensity solution may be stored in database at a block 126, and a report on the stress intensity solution may be provided at a block 128.

Figure 9:
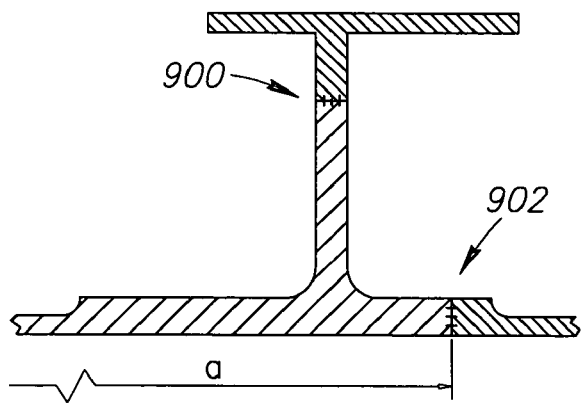
FIGS. 9 and 10 show representative locations along crack front geometries that are defined by the user for extraction of stress intensity data in accordance with alternate embodiments of the present invention.
Figure 10:
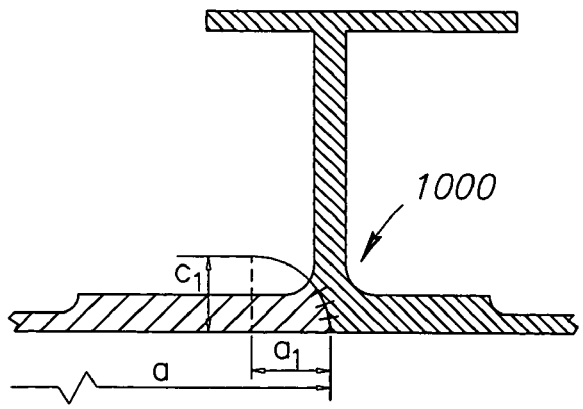

The extraction of selected results from the stress intensity solution performed at block 122 may be performed in a variety of ways according to the user's preferences. Generally, the stress intensities may be extracted from the finite element model results at a user-defined number of locations along each crack front. For example, FIGS. 9 and 10 show representative locations 900, 902, 1000 along the crack front geometries that are defined by the user for extraction of stress intensity data. More specifically, FIG. 9 shows five locations 900 along a first straight crack and five locations 902 along a second straight crack, while FIG. 10 shows five locations 1000 along an elliptical crack. Of course, an alternate embodiment, a greater or fewer number of locations for data extraction along each crack may be used.

Figure 11:
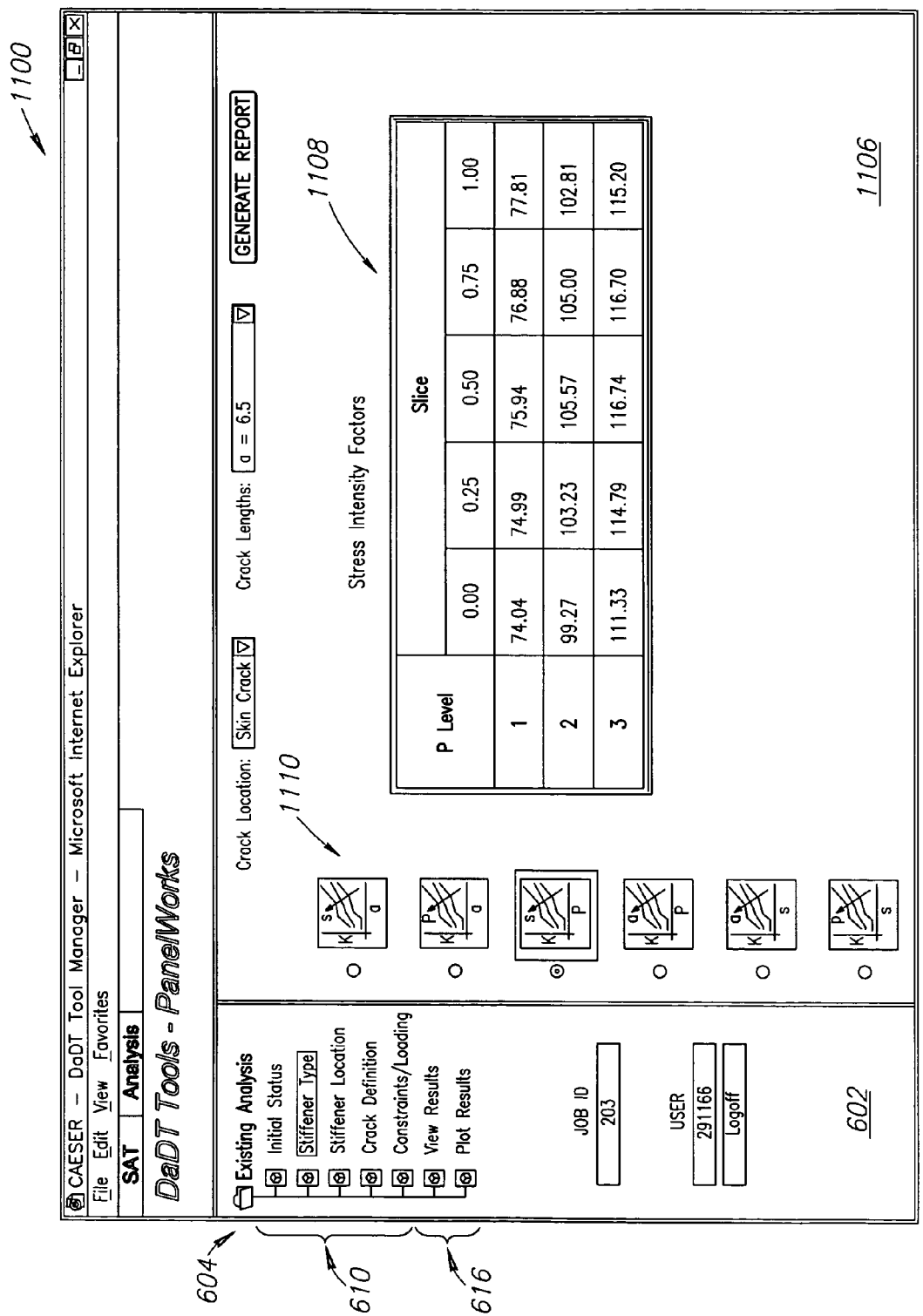
FIG. 11 is representative output menu of a stress intensity solutions as viewed by a user in graphical form in accordance with an embodiment of the invention.
Figure 16:
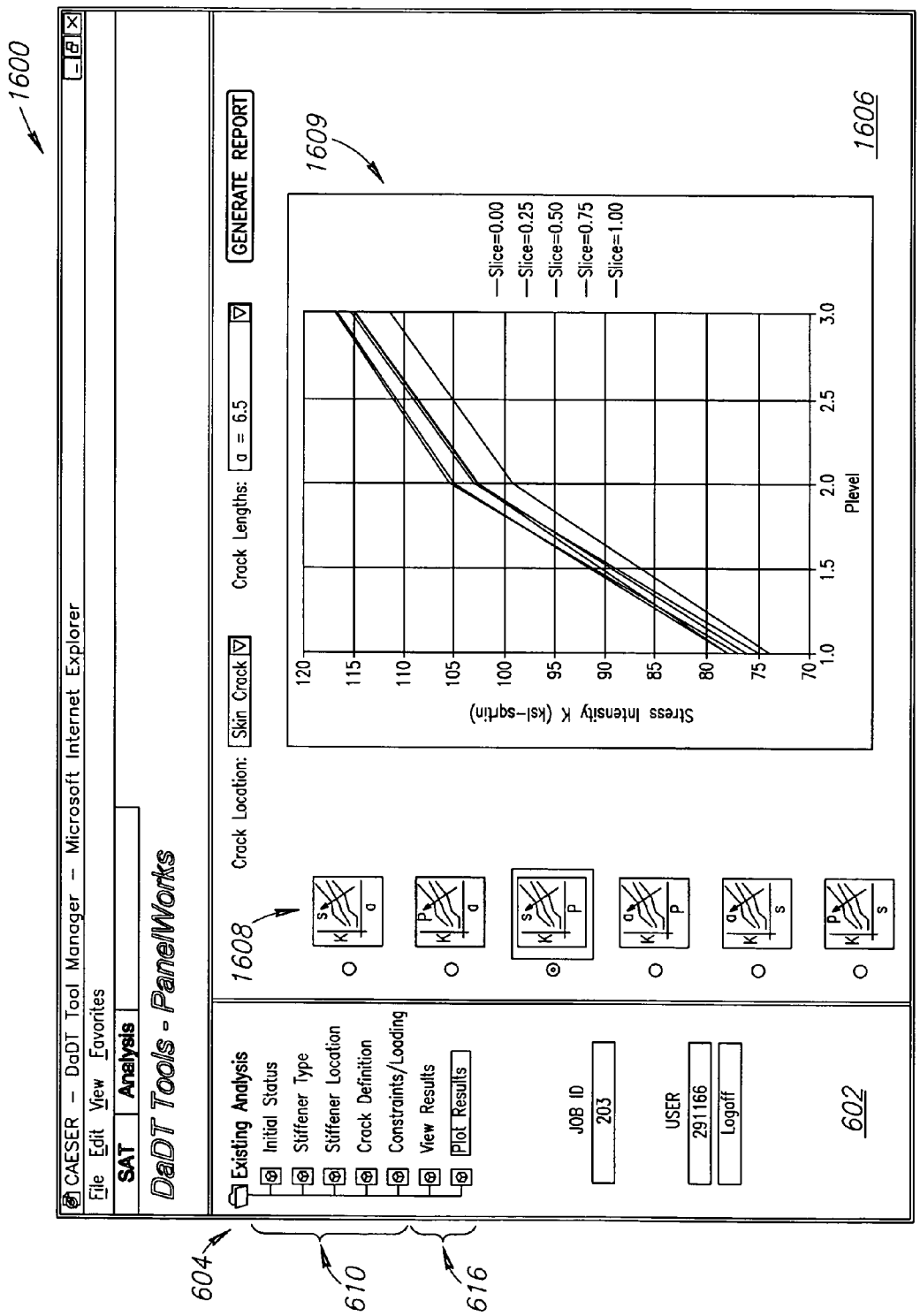
FIG. 16 is a representative menu of the menu-based input program for presenting plots of results in accordance with an embodiment of the invention.

Typically, one more portions of the method 100 (e.g., block 122, block 124, block 128, etc.) will involve viewing the results of the stress intensity solution by the user. For example, FIG. 11 is a representative output menu 1100 of a stress intensity solution as viewed by a user in graphical form. In this embodiment, the output menu 1100 includes the first window portion 602 described above, and a second window portion 1106 that includes a table of stress intensities 1108. More specifically, the table of stress intensities 1108 provides the stress intensity values at each user defined location for each individual crack (FIGS. 9 and 10). Alternately, the user may elect to view the stress intensity solution in graphical form by clicking on the appropriate graph options 1110 provided in the second window portion 1106. FIG. 16 is a representative menu 1600 of the menu-based input program for presenting plots of results. In this embodiment, the user has highlighted the "PLOT RESULTS" option in the first window portion 602. A plurality of plotting options 1608, and a visual plot 1609 of the results, are provided in a second window portion 1606.

Figure 17:
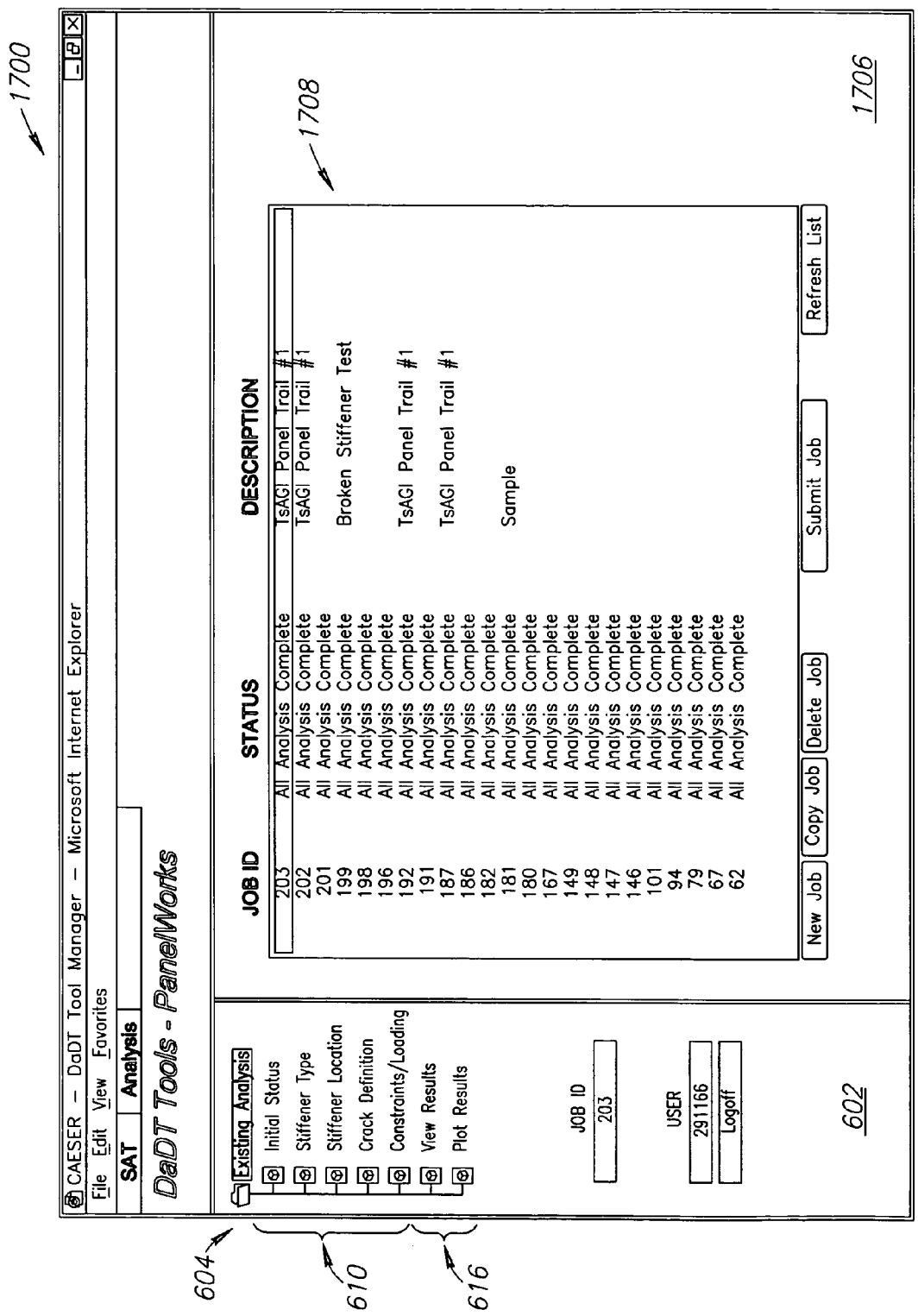
FIG. 17 is a representative menu of the menu-based input program for presenting results of previously computed analyses in accordance with another embodiment of the invention.

FIG. 17 is a representative menu 1700 of the menu-based input program for presenting resulting of previously computed analyses. In this embodiment, the user has highlighted the "EXISTING ANALYSES" option in the first window portion 602. A plurality of previously determined analysis results 1708 are provided in a second window portion 1706. The menu 1700 allows the user to easily and efficiently review previously determined results.

Figure 12:
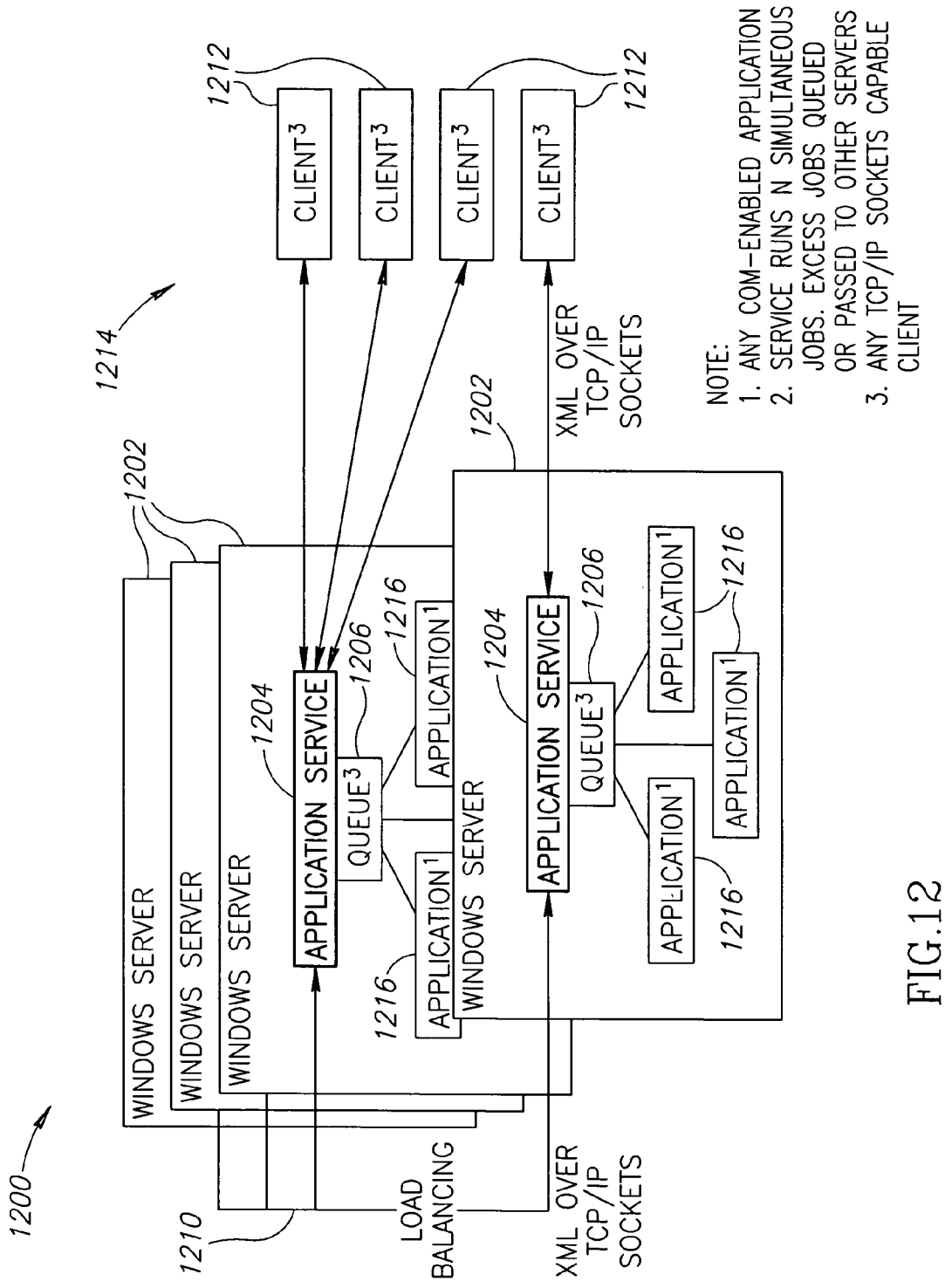
FIG. 12 is a schematic view of a web-based system for calculating stress intensity solutions for integrally stiffened panels in accordance with another embodiment of the present invention.

FIG. 12 is a schematic view of a web-based system 1200 for calculating stress intensity solutions for integrally stiffened panels in accordance with another embodiment of the present invention. The web-based system 1200 includes a plurality of servers 1202, each server 1202 adapted to run Windows-based software programs. An application service 1204 is operating on each server 1202 and is adapted to monitor a queue 1206 of each server 1202 and to communicate with other application services 1204 of other servers 1202 via a communication link 1208, such as a web, a global computer communication system (i.e., Internet), a wireless link, or any other suitable communication device. A plurality of clients 1212 communicate with one or more of the servers 1202 via another communication link 1214 (e.g., a web, a global computer communication system, a wireless link, etc.) to provide suitable inputs to initiate a job on one or more of the servers 1202. In some embodiments, the communications links 1210, 1214 are portions of a single communication network.

In operation, one of the clients 1212 may provide the necessary inputs for the problem definition 102 of the method 100 (FIG. 1), and communicate this information to one of the application services 124. The application service 1204 may check the status of the queue 1206 associated with its particular server 1202, and if adequate resources exist to perform the requested computation, an application 1216 is generated on the server 1202 to compute a stress intensity solution. Depending upon the size of the applications 1216 and the capacity of the server 1202, one or more applications 1216 may run on any given server 1202. If the application service 1204 determines, however, that there are insufficient resources to perform the requested computation on a particular server 1202, then the application service 1204 may perform a load balancing function by checking the resource availability on other servers 1202. If another server 1202 has capacity to handle a particular application 1216, the application service 1204 may pass the application 1216 to that server 1202. Alternately, if none of the servers 1202 have the capacity to handle that particular application 1216, then the application service 1204 may store the application 1216 in a queue 1206 to await the availability of adequate resources needed to perform the computation. The applications services 1204 may be further adapted to provide status information back to the clients 1212 indicating the location, status, and progress of each application 1216 of the system 1200. The application services 1204 may be adapted to perform the above-referenced tasks without input from the clients 1212, or alternately, may solicit and receive instructions from the clients 1212 regarding the load balancing or other functions.

Embodiments of methods and systems in accordance with the present invention may provide significant advantage over the prior art. For example, the entire process may be processed over the world wide web or a company intranet. No local software installation is required beyond a standard web interface (e.g., MS Internet Explorer or Netscape). Additionally, since the process of building a finite element model, extracting a stress intensity solution, and validating the results is highly automated, a user does not need to be a finite element expert or damage tolerance expert to perform the desired stress intensity computations. Building a relatively sophisticated finite element model requires only that a user enter a cross-sectional geometry of a structural member to be analyzed (e.g., panel) and to input the desired cracked lengths for which stress intensities are desired. Thus, embodiments of the present invention enable the user to access a single computational tool that will generate stress intensity solutions for structures, including integrally stiffened panels, for use in calculating the crack growth rate and residual strength using any suitable damage tolerance analysis software without requiring the user to become proficient in the operation of any finite element modeling tools.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method of performing stress intensity computations, comprising:
   providing a problem definition;
   automatically forming a finite element model at least partially based on the problem definition, including building a panel cross-section and extruding the panel cross-section to build a full panel model;
   automatically verifying a suitability condition of the finite element model;
   automatically solving a computational solution using the finite element model;
   automatically validating the computational solution; and
   providing at least a portion of the computational solution for evaluation of a structure.

2. The method of claim 1, wherein providing a problem definition includes at least one of providing a geometry definition, providing a crack definition, and providing a load and constraint definition.

3. The method of claim 1, wherein automatically forming a finite element model at least partially based on the problem definition includes automatically forming a finite element model wherein the problem definition includes at least one crack.

4. The method of claim 1, wherein automatically forming a finite element model at least partially based on the problem definition includes:
   adding at least one crack to the panel cross-section;
   building a computational mesh; and
   applying at least one of a load and a constraint.

5. The method of claim 1, wherein automatically verifying a suitability condition of the finite element model includes automatically verifying at least one of a validity and a solvability of the finite element model.

6. The method of claim 1, wherein automatically validating the computational solution includes automatically determining a numerical convergence of the computational solution.

7. The method of claim 1, farther comprising extracting one or more results from the computational solution.

8. The method of claim 1, further comprising validating one or more stress intensities from the computational solution.

9. The method of claim 1, further comprising storing the computational solution.

10. A computer-readable media containing computer-readable instructions that, when executed by a computer, perform a method of calculating stress intensities, the method comprising:
    providing a problem definition;
    automatically forming a finite element model at least partially based on the problem definition, including building a panel cross-section and extruding the panel cross-section to build a full panel model;
    automatically verifying a suitability condition of the finite element model;
    automatically solving a computational solution using the finite element model, including providing at least a portion of the computational solution for evaluation of a structure; and
    automatically validating the computational solution.

11. The computer-readable media of claim 10, wherein providing a problem definition comprises providing a problem definition that includes at least one of a geometry definition, a crack definition, and a load and constraint definition.

12. The computer-readable media of claim 10, wherein automatically forming a finite element model comprises automatically forming a finite element model wherein the problem definition includes at least one crack.

13. The computer-readable media of claim 10, wherein automatically forming a finite element model comprises automatically forming a finite element model by a process that includes:
    adding at least one crack to the panel cross-section;
    building a computational mesh; and
    applying at least one of a load and a constraint.

14. The computer-readable media of claim 10, wherein automatically verifying comprises automatically verifying at least one of a validity and a solvability of the finite element model.

15. The computer-readable media of claim 10, wherein automatically verifying comprises automatically determining a numerical convergence of the computational solution.

16. A method of performing stress intensity computations, comprising:
    providing a plurality of servers, each server being operatively coupled to at least one other server and having an application service;
    providing a plurality of client computers, each client computer being operatively coupled to at least one of the servers;
    providing a problem definition from a respective one of the client computers to a corresponding one of the servers;
    using the application service of the corresponding one of the servers, determining a resource availability of the corresponding one of the servers and if the resource availability is sufficient, performing an application corresponding to the problem definition on the corresponding one of the servers;
    if the resource availability of the corresponding one of the servers is not sufficient, using the application service of the corresponding one of the servers, determining a second resource availability of at least one other server and if the second resource availability is sufficient, performing the application corresponding to the problem definition on the other server;
    wherein performing the application includes:
       automatically forming a finite element model at least partially based on the problem definition, including building a panel cross-section and extruding the panel cross-section to build a full panel model;

automatically verifying a suitability condition of the finite element model;

automatically solving a computational solution using the finite element model, including providing at least a portion of the computational solution for evaluation of a structure; and automatically validating the computational solution.

17. The method of claim 16, wherein providing a problem definition includes at least one of providing a geometry definition, providing a crack definition, and providing a load and constraint definition.

18. The method of claim 16, wherein automatically forming a finite element model at least partially based on the problem definition includes automatically forming a finite element model wherein the problem definition includes at least one crack.

19. The method of claim 16, wherein automatically forming a finite element model at least partially based on the problem definition includes:

building a panel cross-section;

adding at least one crack to the panel cross-section;

extruding the panel cross-section to build a full panel model;

building a computational mesh; and applying at least one of a load and a constraint.

20. The method of claim 16, wherein automatically verifying a suitability condition of the finite element model includes automatically verifying at least one of a validity and a solvability of the finite element model.

21. The method of claim 16, wherein automatically validating the computational solution includes automatically determining a numerical convergence of the computational solution.

22. The method of claim 16, wherein at least one of the servers includes a queue, and wherein the application service is further configured to store the application in the queue if the resource availability and the second resource availability are insufficient.

23. A system for performing stress intensity computations, comprising:

a plurality of servers, each server being operatively coupled to at least one other server and having an application service and a queue;

a plurality of client computers, each client computer being operatively coupled to at least one of the servers and configured to provide a problem definition input by a user to a corresponding one of the servers;

the application service being configured to determine a resource availability of the corresponding one of the servers and if the resource availability is sufficient, to perform an application corresponding to the problem definition on the corresponding one of the servers;

if the resource availability of the corresponding one of the servers is not sufficient, the application service being further configured to determine a second resource availability of at least one other server and if the second resource availability is sufficient, to perform the application corresponding to the problem definition on the other server;

the application service being further configured to:

automatically form a finite element model at least partially based on the problem definition, including building a panel cross-section and extruding the panel cross-section to build a full panel model;

automatically verify a suitability condition of the finite element model;

automatically solve a computational solution using the finite element model, and provide at least a portion of the computational solution for evaluation of a structure; and automatically validate the computational solution.

24. The system of claim 23, wherein the application service is further configured to automatically form a finite element model wherein the problem definition includes at least one crack.

25. The system of claim 23, wherein the application service is further configured to:

build a panel cross-section;

add at least one crack to the panel cross-section;

extrude a first cross-section to build a full panel model;

build a computational mesh; and apply at least one of a load and a constraint.

26. The system of claim 23, wherein the application service is further configured to automatically verify at least one of a validity and a solvability of the finite element model.

27. The system of claim 23, wherein the application service is further configured to automatically determine a numerical convergence of the computational solution.

28. The system of claim 23, wherein at least one of the servers includes a queue, and wherein the application service is further configured to store the application in the queue if the resource availability and the second resource availability are insufficient.

* * * * *